United States Patent
Alla et al.

(10) Patent No.: US 10,132,285 B2
(45) Date of Patent: Nov. 20, 2018

(54) STARTER VOLTAGE STEP-UP DEVICE AND COMBINATION OF STARTER AND OF THE VOLTAGE STEP-UP DEVICE

(71) Applicant: VALEO EQUIPEMENTS ELECTRIQUES MOTEUR, Creteil (FR)

(72) Inventors: Tarik Alla, Villeurbanne (FR); Nicolas Labbe, Lyons (FR); Raphaël Andreux, Lyons (FR); Benoît Baleydier, Lyons (FR); Pascal Jacquin, Saint Marcel Bel Accueil (FR); José Sanchez, Brignais (FR); Bertrand Riou, Saint Genis Laval (FR)

(73) Assignee: Valeo Equipements Electriques Moteur, Creteil (FR)

( * ) Notice: Subject to any disclaimer, the term of this patent is extended or adjusted under 35 U.S.C. 154(b) by 390 days.

(21) Appl. No.: 14/900,768

(22) PCT Filed: Jul. 1, 2014

(86) PCT No.: PCT/FR2014/051683
§ 371 (c)(1),
(2) Date: Dec. 22, 2015

(87) PCT Pub. No.: WO2015/001246
PCT Pub. Date: Jan. 8, 2015

(65) Prior Publication Data
US 2016/0153416 A1  Jun. 2, 2016

(30) Foreign Application Priority Data

Jul. 1, 2013 (FR) ...................................... 13 56361

(51) Int. Cl.
*H01F 27/24* (2006.01)
*F02N 11/08* (2006.01)
(Continued)

(52) U.S. Cl.
CPC ............ *F02N 11/087* (2013.01); *F02N 11/08* (2013.01); *H01F 27/24* (2013.01);
(Continued)

(58) Field of Classification Search
CPC .......................................... H01F 27/00–27/36
(Continued)

(56) References Cited

U.S. PATENT DOCUMENTS 4,931,701 A * 6/1990 Carl ....................... H05B 41/42
315/239
2004/0169567 A1 9/2004 Okamoto

FOREIGN PATENT DOCUMENTS

EP 2080897 7/2009
EP 2128426 12/2009
(Continued)

*Primary Examiner* — Tuyen Nguyen
(74) *Attorney, Agent, or Firm* — Berenato & White, LLC

(57) ABSTRACT

A starter battery voltage step-up device (LPF) intended to prevent a drop in the battery voltage (Vbat) produced by a current surge in a power circuit of the starter when the starter is powered on. The device comprises a casing of magnetic material (C, YO, CM, CM'), a primary winding circuit (W1) intended to be inserted in series in the power circuit, and a short-circuited secondary winding circuit (W2), in which the primary winding circuit (W1) and/or the secondary winding circuit (W2) comprises a winding formed by at least one flat conductor (3) wound on edge. The invention also relates to the corresponding combination (1) of a starter and a voltage step-up device.

20 Claims, 3 Drawing Sheets

(51) Int. Cl.
    *H01F 37/00*    (2006.01)
    *H02P 1/04*     (2006.01)
    *H02P 1/18*     (2006.01)
    *H01F 27/28*    (2006.01)

(52) U.S. Cl.
    CPC ......... *H01F 27/2847* (2013.01); *H01F 37/00* (2013.01); *H02P 1/04* (2013.01); *H02P 1/18* (2013.01); *F02N 2011/0892* (2013.01); *F02N 2250/02* (2013.01)

(58) Field of Classification Search
    USPC .... 336/65, 83, 180–184, 200, 225–229, 232
    See application file for complete search history.

(56) References Cited

FOREIGN PATENT DOCUMENTS

| | | |
|---|---|---|
| EP | 2578869 | 4/2013 |
| EP | 2579282 | 4/2013 |
| WO | WO2008009350 | 1/2008 |
| WO | WO2012076777 | 6/2012 |
| WO | WO2013014352 | 1/2013 |
| WO | WO2013014356 | 1/2013 |

\* cited by examiner

STARTER VOLTAGE STEP-UP DEVICE AND COMBINATION OF STARTER AND OF THE VOLTAGE STEP-UP DEVICE

CROSS-REFERENCE TO RELATED APPLICATIONS AND CLAIM TO PRIORITY

This application is a national stage application of International Application No. PCT/FR2014/051683 filed Jul. 1, 2014, which claims priority to French Patent Application No. 1356361 filed Jul. 1, 2013, the disclosures of which are incorporated herein by reference and to which priority is claimed.

FIELD OF THE INVENTION

In general, the invention relates to the field of starters for a thermal engine in motor vehicles. This field also incorporates starters which ensure an alternator function known as "alternator-starters". More particularly, the invention concerns a device for stepping up the voltage at the terminals of the vehicle battery when the starter is switched on.

BACKGROUND OF THE INVENTION

When a starter is switched on in order to ensure the starting of the thermal engine of the vehicle, a substantial current requirement arises which is close to the short-circuit current level of the starter, i.e. a current of approximately 1000 A. The intensity of this current requirement when the starter is switched on then decreases as the speed of the armature of the starter, corresponding to the rotor of the machine, increases.

A consequent drop in the voltage at the terminals of the battery corresponds to this initial current surge. Other, less substantial voltage drops then occur during the starting phase, and correspond to passages through successive top dead centres of the thermal engine.

The development of so-called "reinforced" starters, suitable for systems for automatic stopping/restarting of the thermal engine (systems known as stop/start or stop and go) now impose new constraints on motor vehicle components manufacturers relating to compliance with minimum voltage thresholds of the battery during the current requirement when the starter is switched on. Thus, in their specifications, motor vehicle manufacturers define a first voltage threshold which is habitually between 7 and 9 V, below which the battery voltage must not drop. For the following voltage drops, corresponding to the top dead centres of the thermal engine, the battery voltage must remain higher than a second voltage threshold which is habitually between 8 and 9 V. During the starting of the thermal engine, the voltage of the vehicle on-board network thus remains at a value which is sufficient to guarantee the required functioning of the vehicle equipment.

Reinforced starters generally have power which is higher than conventional starters, so as to obtain rapid starting for greater comfort of the users. This results in a higher current requirement when switching gone, and thus a first battery voltage drop which goes beyond the habitual values, and with respect to high requirements. This gives rise to a real difficulty for the designer, since, in order to increase the battery voltage, the starter would have to have internal voltage drops which were so high that there would then no longer be the power necessary to drive the thermal engine at a sufficient speed at low temperature.

Solutions have been proposed to the above-described problem in the prior art. A first known solution is based on the use of voltage-increasing electronic converters in order to prevent an excessively low voltage on the on-board network. A major disadvantage of these converters consists in the substantial costs which they introduce.

Another known solution proposes controlling the starter by means of two relays, timing, and current limitation resistance. In a first functioning phase, the duration of which is determined by the timing, additional resistance is inserted in series in the starter circuit, and limits the initial current surge. In a second functioning phase, the additional resistance is taken out of the starter circuit in order to permit the passage of sufficient current in the armature of the starter, and to permit an increase in speed of the latter.

Documents EP2080897A2 and EP2128426A2 describe a starter of the above-described type. As well as the disadvantage of the additional cost which the supplementary control relay, the timing and the current limitation resistance involve, the introduction of this supplementary relay, which involves mobile mechanical parts subject to wear, has a negative impact on the resistance of the starter in terms of the number of starting cycles which the starter must be able to withstand without difficulty. The resistance of the starter in terms of the number of starting cycles is a particularly stringent constraint for starters which are designed for stop/start systems. In fact, such starters are required to withstand approximately 300,000 starting cycles, i.e. 10 times more than the approximately 30,000 cycles required from the conventional starters.

In addition to the above-described disadvantages, the use of this second solution according to the prior art can prove unsuitable when compliance with a voltage range which is restrictive in terms of time is required by the motor vehicle manufacturer.

For the purpose of eliminating the aforementioned disadvantages, the inventive body has already proposed improvements to the existing starters of the prior art, in particular for applications in motor vehicles with the function of stopping and automatic restarting of the thermal engine.

In general, these improvements have consisted of fitting a filtering device of an inductive type in the power circuit of the starter, so as to prevent a drop of the battery voltage after the current surge produced by putting the electric motor into service.

A filtering device of this type described in particular in document PCT/FR2011/052638 comprises a primary winding circuit which is designed to be inserted in series in the said power circuit, and preferably a short-circuited secondary winding circuit. As can be seen in FIG. 1, the primary winding circuit W1 which is arranged around the core C of the filtering device LPF is formed by a conductor 3 in the form of a flattened part wound on the flattened part, i.e. with the smaller side 1 of the flattened part according to the radius and the larger side L of the flattened part according to the height, which causes problems of dimensions. In addition, a configuration of this type imposes substantial clearance according to the height in the axial direction between the winding and the head, taking into account the substantial helix pitch between the turns which can be seen clearly in FIG. 2.

SUMMARY OF THE INVENTION

The objective of the invention is to improve the compactness of a device of this type whilst maintaining at least the same performance levels by proposing a starter battery voltage step-up device which is designed to prevent a drop of the battery voltage produced by a current surge from intervening in a power circuit of the said starter when it is switched on, comprising a casing made of magnetic material, a primary winding circuit which is designed to be inserted in series in the said power circuit, and a secondary, short-circuited winding circuit, wherein the said primary winding circuit and/or the said secondary winding circuit comprise(s) a winding formed from at least one conductor in the form of a field wound flattened part.

It is clear that persons skilled in the art understand "field wound" to mean the fact of winding with the larger side of the flattened part oriented according to the radius. The invention thus makes it possible to obtain a substantial reduction of the length, the weight and the volume of the device, as well as of the resistance of the winding W2, whilst complying with the same constraints of resistance. The invention also makes it possible to reduce the clearance according to the height between the winding and the head, taking into account the helix pitch which is reduced relative to the winding on a flattened part.

According to one embodiment, the winding of the said primary winding circuit and/or of the said secondary winding circuit comprises a single row of conductors according to a radial direction. A configuration of this type which is very compact will have the same performance as the configuration wound on a flattened part in FIG. 2 with two radial rows of conductors.

According to one embodiment, the said primary winding circuit and/or the said secondary winding circuit has/have a direct return, such that a current input and output of the said primary winding circuit and/or the said secondary winding circuit are positioned on the same side. In this respect, it will be noted that a direct return after the production of a single layer of primary turns would not have been possible with a conductor wound on a flattened part, because of the impossibility of bending.

According to one embodiment, a notch is provided in an inner face of a head of the casing in order to receive the return of the said primary winding circuit and/or of the said secondary winding circuit.

According to one embodiment, the said secondary winding circuit is juxtaposed axially relative to the said primary winding circuit.

According to one embodiment, the said secondary winding circuit is arranged around the said primary winding circuit.

According to one embodiment, the said secondary winding circuit is formed by at least one conductor in the form of a tube.

According to one embodiment, a polarisation winding circuit is designed to be installed in a control circuit of the starter.

According to one embodiment, the said polarisation winding circuit is wound in a direction which is the inverse of that of the said primary winding circuit.

According to one embodiment, the said polarisation winding circuit is wound around the said secondary winding circuit.

According to one embodiment, the said polarisation winding circuit is arranged at an end of the primary and secondary winding circuits.

The invention also relates to a combination of a starter, comprising a direct current electric motor and an electromagnetic contactor, and a starter voltage step-up device according to the invention.

According to one embodiment, the voltage step-up device is fitted in series with the said electric motor in the power circuit.

According to one embodiment, the voltage step-up device is inserted in the power circuit between a power contact of the contactor and the electric motor.

BRIEF DESCRIPTION OF THE DRAWINGS

The invention will be better understood by reading the following description and examining the figures which accompany it. These figures are provided purely by way of non-limiting illustration of the invention.

Elements which are identical, similar or analogous retain the same reference from one figure to another.

DETAILED DESCRIPTION OF THE PREFERRED EMBODIMENT(S)

Figure 1:
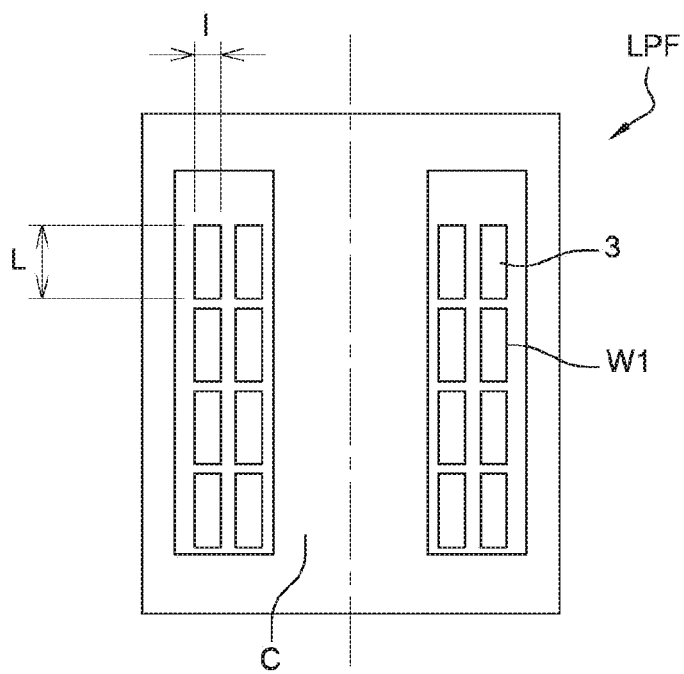
FIG. 1, already described, is a schematic view in axial cross-section of a primary circuit winding arranged around the core of a filtering device according to the prior art.
Figure 2:
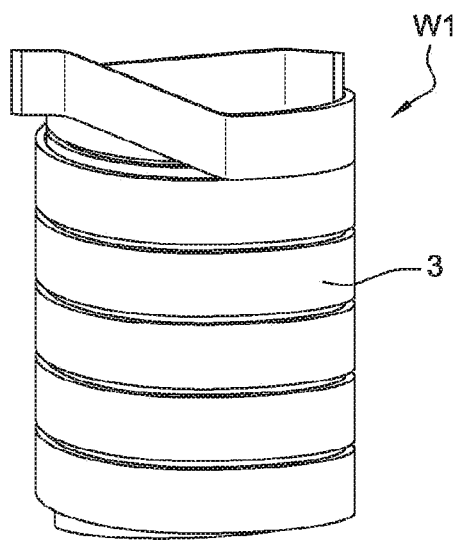
FIG. 2, already described, represents a view in perspective of the primary circuit winding in FIG. 1.
Figure 3:
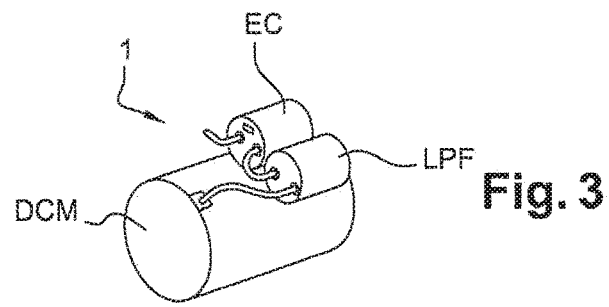
FIG. 3 is a view in perspective showing a combination of a starter and a filtering device of an inductive type according to the invention.

FIG. 3 shows a combination 1 of a starter, comprising a direct current electric motor DCM and an electromagnetic contactor EC, and a voltage step-up device consisting of a filtering device LPF of an inductive type. In this embodiment, the filtering device LPF is secured mechanically on an outer housing of the starter, in the vicinity of the contactor EC.

Figure 4:
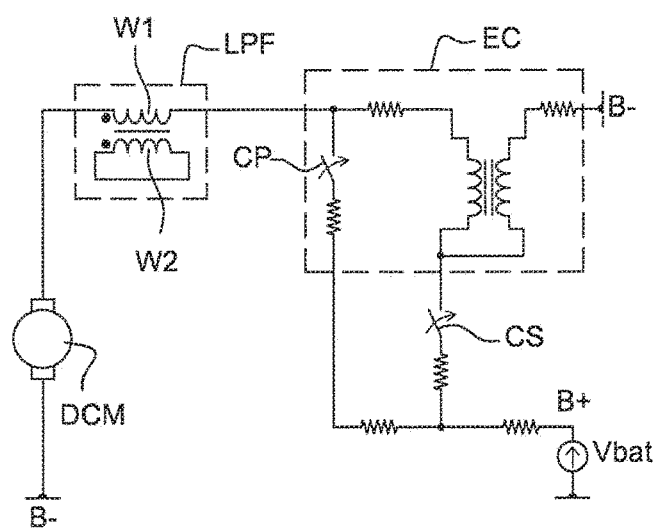
FIG. 4 is a schematic diagram of an electric circuit of a starter comprising the combination in FIG. 3.

The electrical connections between the filtering device LPF, the contactor EC and the electric motor DCM are shown in FIG. 4. The filtering device LPF is fitted electrically in series between the power contact CP of the contactor EC and the motor DCM.

In an alternative embodiment (not represented), the filtering device LPF is not integrated in the starter EC, DCM, but is inserted in the power circuit between the positive terminal B+ of the battery and the power contact CP.

The contactor EC is in this case a conventional starter contactor with a simple power contact CP, and comprises a solenoid formed by a pull-in coil and a hold-in coil. The closure of a starter contact CS of the vehicle controls the excitation of the pull-in and hold-in coils, and the activation of the starter according to sequencing which is well known to persons skilled in the art, and will not be described in detail here.

The strong initial current surge previously referred to intervenes at closure of the power contact CP, when the motor DCM is supplied with full power. Closure of the power contact CP also gives rise to circulation in the filtering device LPF of a power current which supplies the motor DCM.

As is clearly apparent from its wiring diagram, in this case the filtering device LPF is a device of an inductive type which is produced in the form of a transformer of the armoured type with magnetically coupled windings. It will be noted that, depending on the applications, a simple inductive resistor could have been used to form the low-pass filtering device to which the optimisation work relates. However, the embodiment with a transformer makes it possible to have more parameters in order to adjust the frequency response of the device LPF according to the application. Thus, it is possible to optimise this response by regulating the inductive resistors of the primary and secondary circuits W1, W2, and the inductance introduced by the coupling between these circuits.

The primary winding circuit W1 is the one which is inserted in the power circuit of the starter. The secondary winding circuit W2 is short-circuited. Typically, the equivalent inductance of the inductive filtering device LPF is between 0.1 and 10 mH approximately for currents with an order of magnitude of 300 to 1000 A.

The battery voltage step-up effect obtained is derived from the fact that when the motor DCM is switched on, the initial current surge is cut (attenuated by approximately half) because of the production of strong currents induced in the secondary short-circuited circuit W2, which, by means of their effects, oppose the sudden variation of magnetic flux which has generated them.

Figure 5:
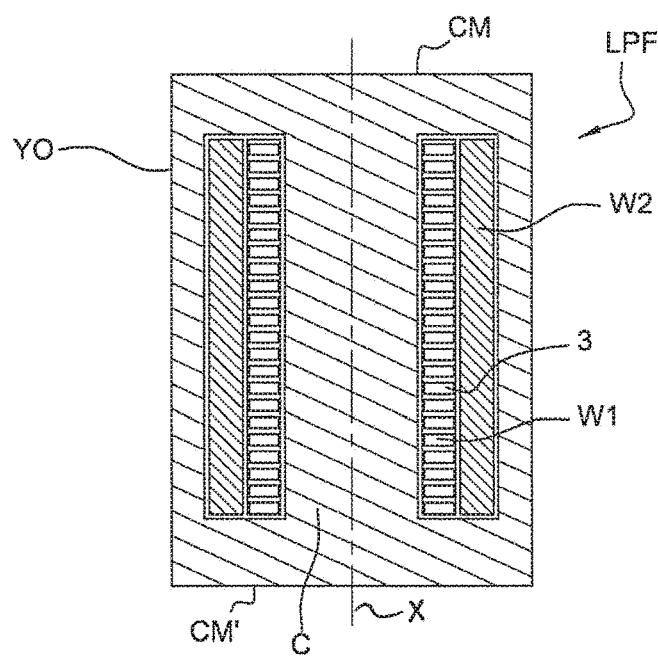
FIG. 5 is a view in axial cross-section of the filtering device according to the invention in a first embodiment.

As can be seen in FIG. 5, the filtering device LPF of an inductive type substantially comprises a casing C, YO, CM, CM' made of magnetic material such as steel, and primary W1 and secondary W2 winding circuits preferably made of copper. The casing comprises a cylindrical head YO having a central axis X, two closure parts CM, CM' and an axial core C around which the winding circuits W1, W2 are arranged.

Figure 6:
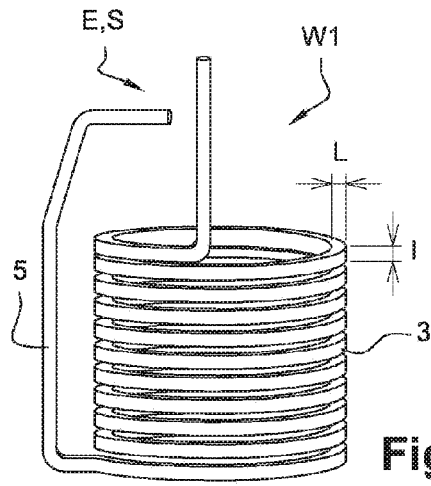
FIG. 6 represents a view in perspective of the primary winding circuit of the filtering device in FIGS. 5, 8*a* and 8*b*.
Figure 8A:
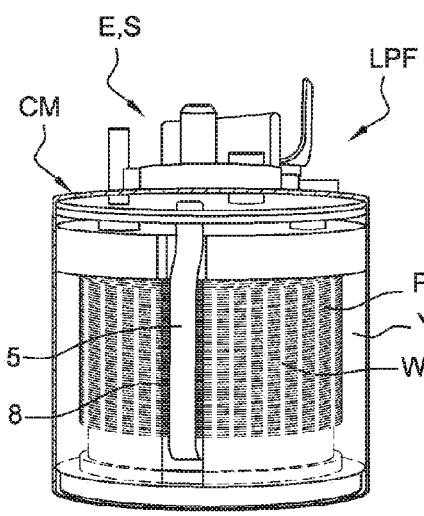
FIGS. 8*a* and 8*b* show respectively a view in perspective and a view in axial cross-section of the filtering device according to the invention, in a second embodiment.
Figure 8B:
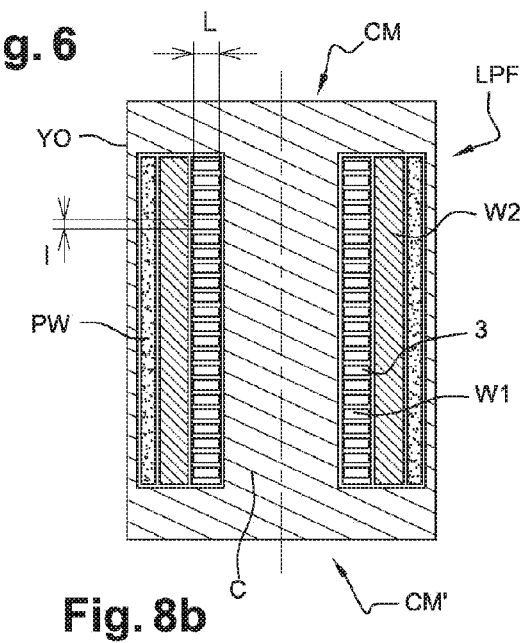

More specifically, as can be seen in FIGS. 5, 6 and 8b, the winding of the primary winding circuit W1 is formed from a rectangular conductor 3 having a larger side L and a smaller side I. The primary winding circuit W1 is formed in the form of a field-wound flattened part, i.e. with the larger side L of the flattened part oriented radially according to the radius of the head YO (i.e., in a radial direction orthogonal to the axial core C), and the smaller side I oriented axially according to the height (i.e., in an axial direction parallel to the axial core C). In this case, the winding of the primary winding circuit arranged around the core C comprises a single row of conductors 3 in the radial direction, which provides the assembly with a compact appearance.

As is clearly apparent from FIGS. 6 and 8a, the primary winding circuit W1 has a non-wound direct return 5, such that the current input E and output S of the primary winding circuit W1 are positioned on the same side of the head YO. This return 5 extends substantially axially according to a direction opposite a direction of winding of the layer of the primary winding circuit W1 along the said winding.

In other words, the winding of the primary winding circuit W1 is produced from a handy conductor 3, field-wound only "outwardly" in order to obtain a winding layer which thus comprises a single row of conductors in the radial direction, then, the conductor 3 is bent according to its larger side in order to provide the return 5, such as to make the current input E and the current output S emerge from the primary winding circuit W1 on the same side.

Figure 7:
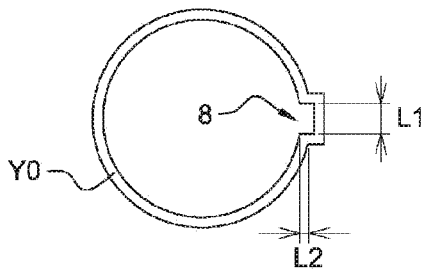
FIG. 7 shows a view in transverse cross-section of the head of the filtering device according to the invention.

The return 5 of the winding can be produced on the exterior of the head YO. However, preferably, a notch 8 with axial orientation which can be seen clearly in FIGS. 7 and 8a is provided in an inner face of the head YO in order to receive the return 5 of the conductor inside the casing. The notch 8 has a transverse cross-section with a form substantially complementary to that of the flattened part of the conductor. Thus, as can be seen in FIG. 7, the notch 8 has a substantially tangential dimensional L1 corresponding to the larger side L of the flattened part and a radial dimension L2 corresponding to the smaller side 1 of the flattened part. The axial length of the notch 8 corresponds to the length of the return 5.

In addition, the secondary winding circuit W2 is short-circuited. As shown in FIG. 5, the secondary winding circuit W2 in this case comprises a plurality of turns forming a winding which is positioned around the primary winding circuit W1. As a variant, the secondary winding circuit W2 can be produced in the same manner as the primary winding circuit W1, i.e. from a conductor with a field-wound flattened form.

Alternatively, the secondary winding circuit W2 can advantageously be constituted by a conductive tube (for example made of copper or aluminium) which is concentric to the primary winding circuit W1. This tube can be situated around the primary winding circuit or juxtaposed axially relative to the bottom-mounted primary winding circuit W1, as described in document PCT/FR2011/052638.

A structure of this type can lead to production of a filtering device LPF which is simpler to create than the secondary winding circuit W2 with a plurality of turns. It will be noted that the maintenance of an identical ratio of length to radius, compared with a secondary winding circuit W2 with a plurality of turns, will require correct dimensioning of the thickness of the tube. The electrical functioning of the filtering device LPF will not be modified because of the ratio N2/N1 which characterises the transformer, provided that there is transition from a resistance R for N2 turns, to a resistance $R/N2^2$ for one turn with the tube, N2 and N1 being respectively the numbers of turns of the winding circuits W2 and W1.

In the embodiment in FIGS. 8a and 8b, the filtering device LPF additionally comprises a polarisation winding circuit PW wound in the direction which is the inverse of that of the primary winding circuit W1. The polarisation winding circuit PW is arranged around the secondary winding circuit W2.

Figure 9:
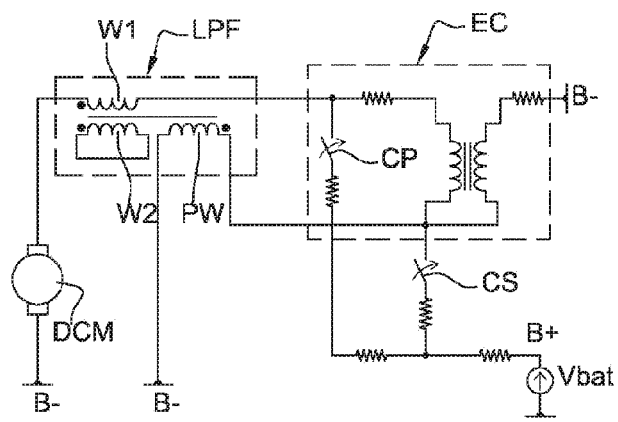
FIG. 9 represents the schematic diagram of the electric circuit of a starter incorporating the filtering device in FIGS. 8*a* and 8*b*.

As shown in FIG. 9, the polarisation winding circuit PW is designed to be connected to the control circuit of the starter. More specifically, the polarisation winding circuit PW is connected between the negative terminal B− of the battery and the starting contact CS of the vehicle.

Wiring of this type permits establishment of current with a steady state in the polarisation winding circuit PW at the same time as the excitation of the pull-in coils and hold-in coils of the electromagnetic contactor EC, i.e. approximately 25 ms before the closure of the power circuit by the power contact CP.

The pre-polarisation of the magnetic circuit YO, C before the transient establishment of the power circuit 1 makes it possible to benefit from greater variation of induction, which makes it possible to delay the saturation. The electric motor DCM can thus reach a higher speed of rotation, and therefore generates a higher counter-electromotive force at the moment of saturation, which contributes towards limiting the power current 1.

This second embodiment makes it possible to produce a highly efficient optimised filtering device LPF.

Alternatively, the polarisation winding circuit PW can be wound around the axial core C at an end of the primary and secondary windings W1, W2, as described for example in document PCT/FR2012/051610.

It will be appreciated that persons skilled in the art will be able to modify the battery voltage step-up device previously described without departing from the context of the invention. Thus, as a variant, the primary winding circuit W1 and/or the secondary winding circuit W2 will be able to be produced from a plurality of handy conductors, wound on a plurality of layers.

In other variant embodiments, the axial core C can have at least one air gap, as described in document PCT/FR2012/051568. An air gap of this type in the magnetic circuit C, YO, CM, CM' makes it possible to obtain the saturation of this magnetic circuit later.

The invention claimed is:

1. A voltage step-up device (LPF) of a starter for a thermal engine of a motor vehicle, said voltage step-up device (LPF) configured to prevent a drop of a battery voltage (Vbat) produced by a current surge from intervening in a power circuit of said starter when said starter is switched on, said voltage step-up device (LPF) comprising:
   a casing made of magnetic material (C, YO, CM, CM'), said casing comprising a cylindrical head (YO) having a central axis (X), and
   a primary winding circuit (W1) configured to be inserted in series in said power circuit, and a secondary, short-circuited winding circuit (W2),
   said primary winding circuit (W1) comprising a winding formed from at least one conductor (3) in the form of a field-wound flattened part, a larger side (L) of said flattened part oriented in a radial direction orthogonal to said central axis (X), and a smaller side (I) oriented in an axial direction parallel to said central axis (X),
   both said primary winding circuit (W1) and said secondary winding circuit (W2) arranged around said central axis (X) and disposed inside said cylindrical head (YO).

2. The voltage step-up device (LPF) according to claim 1, wherein the winding of said primary winding circuit (W1) comprises a single row of conductors in the radial direction.

3. The voltage step-up device (LPF) according to claim 1, wherein said primary winding circuit (W1) has a direct return (5), such that a current input (E) and output (S) of said primary winding circuit (W1) are positioned on the same side.

4. The voltage step-up device (LPF) according to claim 3, wherein a notch (8) is in an inner face of said cylindrical head ((YO)) of the casing receives said direct return (5) of said primary winding circuit (W1).

5. The voltage step-up device (LPF) according to claim 1, wherein said secondary winding circuit (W2) is juxtaposed axially relative to said primary winding circuit (W1).

6. The voltage step-up device (LPF) according to claim 1, wherein said secondary winding circuit (W2) is arranged around said primary winding circuit (W1).

7. The voltage step-up device (LPF) according to claim 1, wherein said secondary winding circuit (W2) is formed by at least one conductor in the form of a tube.

8. Device according to claim 1, wherein a polarization winding circuit (PW) is configured to be installed in a control circuit of said starter.

9. The voltage step-up device (LPF) according to claim 8, wherein said polarization winding circuit (PW) is wound in a direction which is the inverse of that of said primary winding circuit (W1).

10. The voltage step-up device (LPF) according to claim 8, wherein said polarization winding circuit (PW) is wound around said secondary winding circuit (W2).

11. The voltage step-up device (LPF) according to claim 8, wherein said polarization winding circuit (PW) is arranged at an end of the primary and secondary winding circuits (W1, W2).

12. A combination (1) of a starter for a thermal engine of a motor vehicle, comprising a direct current electric motor (DCM) and an electromagnetic contactor (EC), and a voltage step-up device (LPF), said voltage step-up device (LPF) configured to prevent a drop of a battery voltage (Vbat) produced by a current surge from intervening in a power circuit of said starter when said starter is switched on, said voltage step-up device (LPF) comprising:
   a casing made of magnetic material (C, YO, CM, CM'), said casing comprising a cylindrical head (YO) having a central axis (X), and
   a primary winding circuit (W1) configured to be inserted in series in said power circuit, and a secondary, short-circuited winding circuit (W2),
   said primary winding circuit (W1) comprising a winding formed from at least one conductor (3) in the form of a field-wound flattened part, a larger side (L) of said flattened part oriented in a radial direction orthogonal to said central axis (X), and a smaller side (I) oriented in an axial direction parallel to said central axis (X),
   both said primary winding circuit (W1) and said secondary winding circuit (W2) arranged around said central axis (X) and disposed inside said cylindrical head (YO).

13. The combination according to claim 12, wherein the voltage step-up device (LPF) is fitted in series with said electric motor (DCM) in the power circuit.

14. The combination according to claim 12, wherein the voltage step-up device (LPF) is inserted in the power circuit between a power contact (CP) of the contactor (EC) and the electric motor (DCM).

15. The voltage step-up device (LPF) according to claim 2, wherein said primary winding circuit (W1) has a direct return (5), such that a current input (E) and output (S) of said primary winding circuit (W1) are positioned on the same side.

16. The voltage step-up device (LPF) according to claim 2, wherein said secondary winding circuit (W2) is juxtaposed axially relative to said primary winding circuit (W1).

17. The voltage step-up device (LPF) according to claim 3, wherein said secondary winding circuit (W2) is juxtaposed axially relative to said primary winding circuit (W1).

18. The voltage step-up device (LPF) according to claim 4, wherein said secondary winding circuit (W2) is juxtaposed axially relative to said primary winding circuit (W1).

19. The voltage step-up device (LPF) according to claim 2, wherein said secondary winding circuit (W2) is arranged around the said primary winding circuit (W1).

20. The voltage step-up device (LPF) according to claim 3, wherein said secondary winding circuit (W2) is arranged around the said primary winding circuit (W1).

* * * * *